United States Patent
Liu et al.

(12) 
(10) Patent No.: US 6,492,889 B1
(45) Date of Patent: Dec. 10, 2002

(54) ELECTROMAGNETIC ACTUATOR FOR OBTAINING MICRO MOVEMENT AND MICRO ROTATION OF AN OBJECT

(75) Inventors: Chin-Sung Liu, Miou-Li (TW); Li-Chung Peng, Shin-Chu (TW)

(73) Assignee: Acute Applied Technologies Inc. (TW)

( * ) Notice: Subject to any disclaimer, the term of this patent is extended or adjusted under 35 U.S.C. 154(b) by 39 days.

(21) Appl. No.: 09/711,537

(22) Filed: Nov. 14, 2000

(51) Int. Cl.$^7$ ................................................ H01F 7/08
(52) U.S. Cl. ........................................ 335/220; 335/225
(58) Field of Search .................. 335/266–8, 220–229; 269/44.22, 219–221, 814, 823, 824

(56) References Cited

U.S. PATENT DOCUMENTS 5,659,525 A * 8/1997 Miyamae et al. ......... 369/44.22

* cited by examiner

Primary Examiner—Lincoln Donovan
(74) Attorney, Agent, or Firm—Lowe Hauptman Gilman & Berner, LLP

(57) ABSTRACT

An electromagnetic actuator for efficiently moving an objective lens along a focusing direction and a tracking direction. The electromagnetic actuator includes a flux generator, a first set of coils, a second set of coils and a magnetic piece. A first magnetic part and a second magnetic part of the flux generator are placed within a gap for generating smooth magnetic lines of force. The first set of coils moves the objective lens along the focusing direction. The second set of coils provide micro rotation around a shaft to the objective lens, and magnetic pieces are placed in the magnetic circuit adjacent to the gap. The objective lens holder is held at the neutral position relating focusing and tracking directions while the magnetic attraction forces are acting on the magnetic pieces.

16 Claims, 5 Drawing Sheets

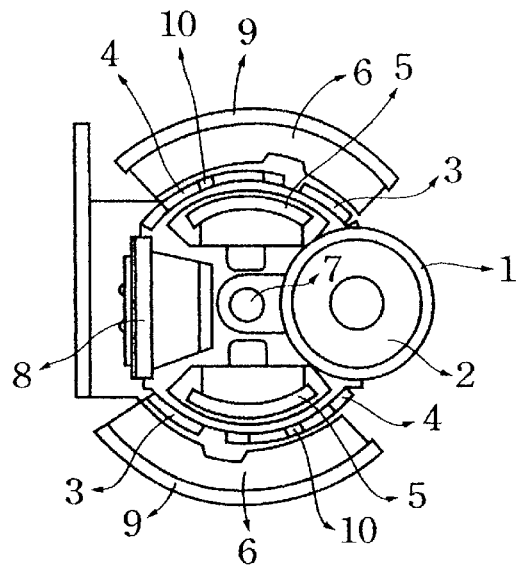
Fig.1(a)  *(PRIOR ART)*
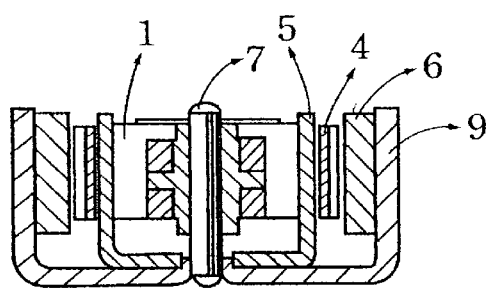
Fig.1(b)  *(PRIOR ART)*
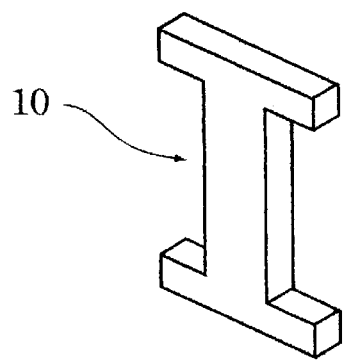
Fig.1(c)  *(PRIOR ART)*

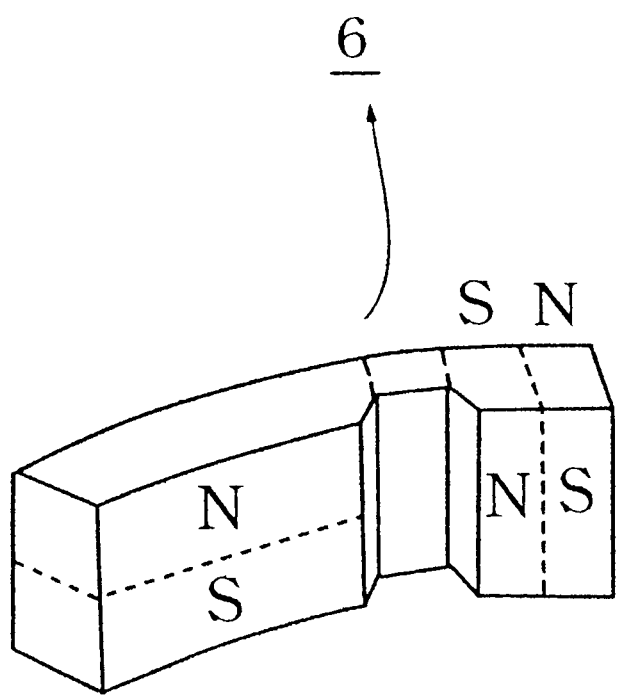
Fig.1(d) *(PRIOR ART)*

ELECTROMAGNETIC ACTUATOR FOR OBTAINING MICRO MOVEMENT AND MICRO ROTATION OF AN OBJECT

BACKGROUND OF THE INVENTION

1. Field of the Invention

The present invention generally relates to an electromagnetic actuator for moving an object along a focusing direction and/or a tracking direction. Particularly, the object is directed to a lens holder.

2. Background Description

Generally, the operation of an information writing/reading apparatus is performed on a disk-shaped recording medium such as a compact disk, Magneto-Optical disk (MO) or the like.

However, a disk is usually not perfectly flat and symmetric. The disk usually contains inevitable warp and eccentricity. It causes misreading because the photo sensor of the optical head reads a laser reflected from the disk. If the disk has a warped surface or is eccentric, the laser would not be able to read correctly by the optical head. Therefore, the information writing and reading apparatus preferably includes means for moving the objective lens in response to the deviations resulting from the variable warped surface and/or the eccentricity of the disk. The movement is generally performed on a micro level along two orthogonal directions, for examples, a focusing direction perpendicular to the disk surface and a tracking direction parallel to the disk surface in order to compensate the focusing deviation and the tracking deviations respectively.

Further, for moving the objective lens in a micro level, there is a prior known objective lens drive unit described in the U.S. Pat. No. 5,659,525. FIGS. 1A and 1B shown the top view and cross section of the objective lens drive unit of the patent respectively. U.S. Pat. No. 5,659,525 to Akira Miyamae et al. discloses a lens holder 1 which is able to rotate along the tracking direction and movable along the focusing direction, around the shaft 7. The lens 2 is placed on the lens holder 1. The balancer 8 is opposite to the lens holder 2 according to the position of the shaft 7. Couples of focusing drive coils and the tracking drive coils are mounted to the lens holder 1 and the balancer 8. By the flux provided by the permanent magnet 6 and the electromagnetic attraction, the lens holder is therefore rotatable along the tracking direction and movable along the focusing direction. The outer yoke 9 is directed to provide placement for the permanent magnet 6. The inner yoke 10 is directed to limit the rotation range of the lens holder 1. A two dimensional restoring force is provided by the interaction of the magnetic piece 10 and the permanent magnet 6. In this case, once the tracking drive coil and the focusing drive coil are not actuated, the lens holder is able to return to a stationary neutral position.

Further referring to FIGS. 1C and 1D, a detailed structure of the magnetic piece 10 and the permanent magnet 6 is shown. The magnetic piece 10 is molded as an I shape. The permanent magnet 6 is curved with two polarization on one side. In this case, the construction is not easy to manufacture and takes time to complete. Moreover, the flux routes of the focusing drive coil 4 and the tracking drive coil 3 is not efficient.

SUMMARY OF THE INVENTION

It is therefore an object of the present invention to provide an electromagnetic actuator for obtaining micro movement along a focusing direction and micro rotation along a tracking direction.

According to a first aspect of the present invention, an electromagnetic actuator for moving an object along a focusing direction and a tracking direction includes a flux generator, having a first magnetic part and a second magnetic part, wherein the same polarization areas of the first magnetic part and the second magnetic part are opposite with a gap in order to generate a smooth first set of magnetic lines of force and a smooth second set of magnetic lines of force in an area of magnetic force; a first set of coils, connected to an object and positioned within the area of magnetic force, wherein the first set of coils moves the object along a direction of a shaft, especially in response to the tense of electric current actuated in the coils; a second set of coils, connected to the object and position around the area of magnetic force, wherein the second set of coils rotates the object around the shaft, in response to the tense of electric current actuated in the coils; and a metal piece, connected to the object and positioned adjacent to the first set of magnetic lines of force and the second set of magnetic lines of force in order to control the distance of the gap and further being able to provide a restoring force to return the object at a stationary neutral position when the coils are not actuated.

Preferably, the object is a lens holder for holding an objective lens of an information reading and writing optical head.

Preferably, the first set of coils is a focusing drive coil and the second set of coils is a tracking drive coil.

Preferably, a perpendicular line of the plane formed by the tracking drive coil is parallel to a tangent line of the cross circle of the shaft. Preferably, the flux generator is made by permanent magnets wherein the polarization areas of the permanent magnets are opposite within the gap.

Preferably, the electromagnetic actuator further includes another mirrored set of the flux generator, the first set of coils, the second set of coils and the metal piece.

According to a second aspect of the present invention, the electromagnetic actuator includes a flux generator, having a first magnetic part and a second magnetic part, wherein the same polarization areas of the first magnetic part and the second magnetic part are opposite with a gap in order to generate a smooth first set of magnetic lines of force and a smooth second set of magnetic lines of force in an area of magnetic force; a first set of coils, connected to an object and positioned within the area of magnetic force, wherein the first set of coils moves the object along a direction of a shaft, especially in response to the tense of electric current actuated in the coils; and a metal piece, connected to the object and positioned adjacent to the first set of magnetic lines of force and the second set of magnetic lines of force in order to control the distance of the gap and further being able to provide a restoring force to return the object at a stationary neutral position when the coils are not actuated.

According to a third aspect of the present invention, an electromagnetic actuator includes a flux generator, having a first magnetic part and a second magnetic part, wherein the same polarization areas of the first magnetic part and the second magnetic part are opposite with a gap in order to generate a smooth first set of magnetic lines of force and a smooth second set of magnetic lines of force in an area of magnetic force; a first set of coils, connected to the object and position around the area of magnetic force, wherein the second set of coils rotates the object around the shaft, in response to the tense of electric current actuated in the coils; and a metal piece, connected to the object and positioned adjacent to the first set of magnetic lines of force and the second set of magnetic lines of force in order to control the distance of the gap and further being able to provide a restoring force to return the object at a neutral central position when the coils are not actuated.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is the top view of prior known objective lens drive unit;

FIG. 1B shows the cross section of the prior known objective lens drive unit;

FIG. 1C shows the magnetic piece of the objective lens drive unit.

FIG. 1D shows the permanent magnet of the objective lens drive unit.

DETAILED DESCRIPTION OF A PREFERRED EMBODIMENT OF THE INVENTION

FIGS. 2A, 2B, 2C and 2D shows a preferred embodiment of the present invention. The embodiment is directed to an objective lens drive unit of an optical head especially for the requirement of modern high speed information reading and writing devices.

Figure 2A:
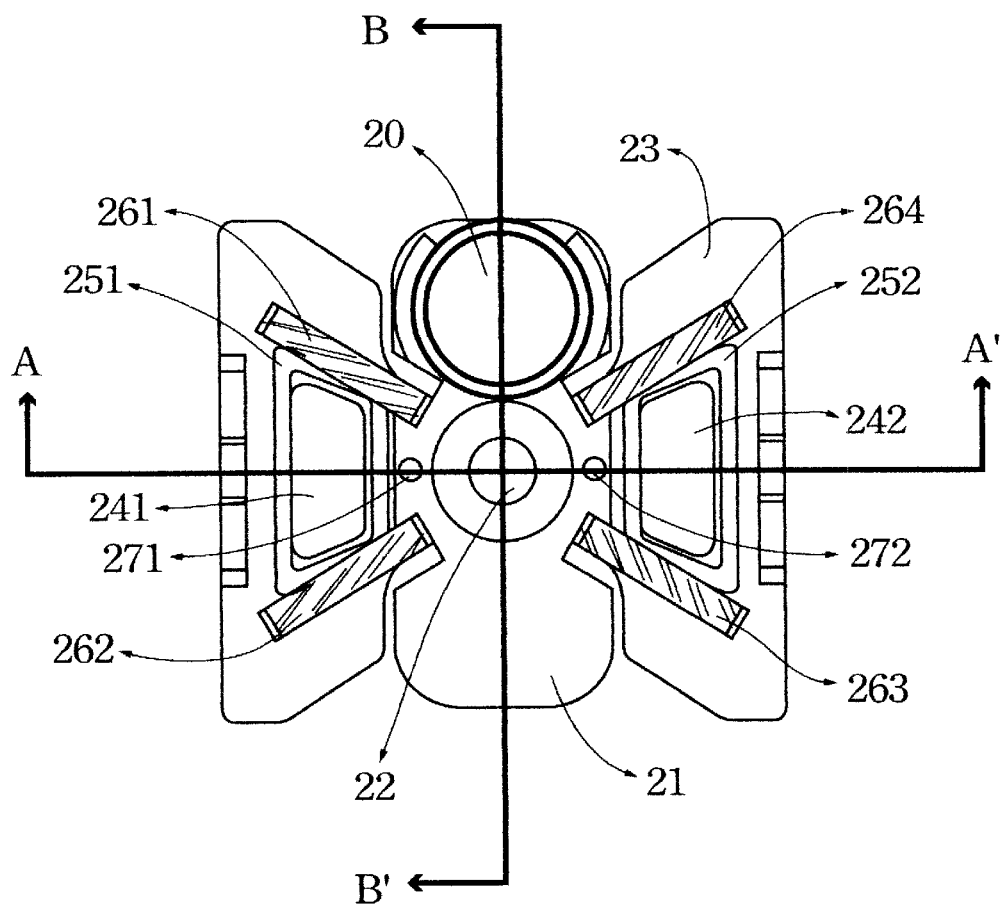
FIG. 2A is the top view of the present invention.

FIG. 2A is the top view of the objective lens drive unit having a lens holder 21 for holding an objective lens 22. The lens holder 21 is coupled on a shaft 22. The shaft is set on the yoke 23. Flux generators 241, 242 are conducted by two sets of permanent magnets, and the same polarization of the magnets are opposite to each other referring to the shaft 22. A first set of coils 251 and 252 is fixed on the lens holder 21 and is the focusing drive coil. A second set of coils 261, 262, 263 and 264 is the tracking drive coil.

Figure 2B:
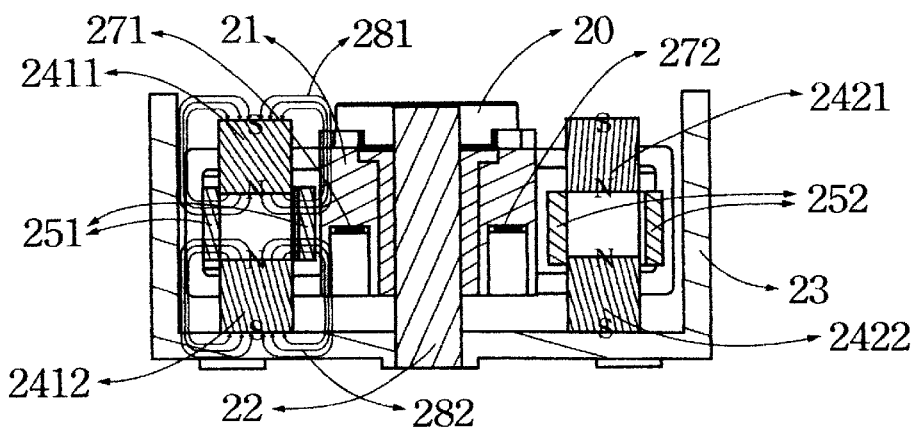
FIG. 2B shows the cross section of the present invention along A–A' line.
Figure 2C:
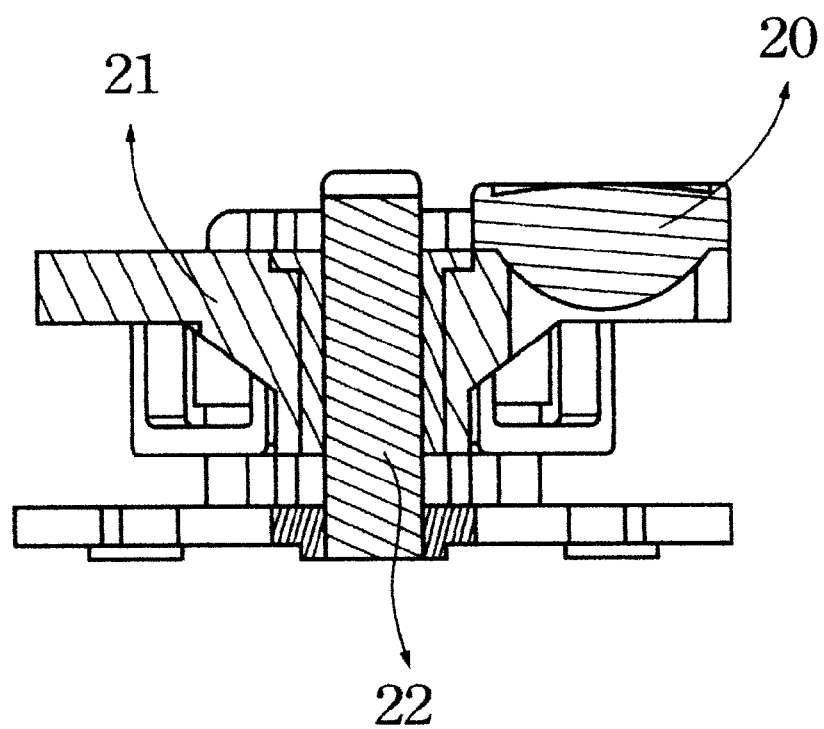
FIG. 2C shows the cross section of the present invention along B–B' line.

FIG. 2B shows a cross section of the objective lens drive unit of the present invention along A–A' line in FIG. 2A. FIG. 2C show another cross section of the present invention along B–B' line in FIG. 2A. The first magnetic part 2411, the second magnetic part 2412, the third magnetic part 2421 and the fourth magnetic part 2422 of the flux generators 241 and 242 are demonstrated. Since the first magnetic part 2411 and the second magnetic part 2412 are placed within a gap and the same polarization of the parts are opposite, smooth magnetic lines of force 281 and force 282 are therefore generated. The situation of the third magnetic part 2421 and the fourth magnetic part 2422 is occurred the same thereof. Further, the first set of coils is placed on the area of magnetic lines of force. The second set of coils is placed on the far side of the area of magnetic lines of force. Moreover, the perpendicular line of the plane which is formed by the second set of coils is parallel to the tangent line of the cross circle of the shaft 22. The utilization rate of the magnetic line route of the first set of coils 251 and 252 are nearly one hundred percent. The utilization rate of the magnetic line route of the second set of coils 261, 262, 263 and 264 are approaching seventy to eighty percent. As being a focusing drive coil, the first set of coils 251 and 252 generates a responsive force to provide micro movement of the lens holder 21 along the direction of the shaft 22, by in response to the tense of electric current in the coils. As being a tracking drive coil, the second set of coils 251 and 252 generates a responsive force to provide micro rotation of the lens holder 21 around the shaft 22, by in response to the tense of electric current in the coils.

According to the pieces 271 and 272 (coin shaped metal pieces are shown in figures), they are arranged opposite around the shaft 22. The pieces 271 and 272 are placed in the neighboring areas of the magnetic lines of forces 281 and 282. By controlling the gap of the magnetic parts, the attraction of the magnetic forces are able to provide a restoring force. In this case, an object is able to return to a neutral central position when the coils are not actuated.

Figure 2D:
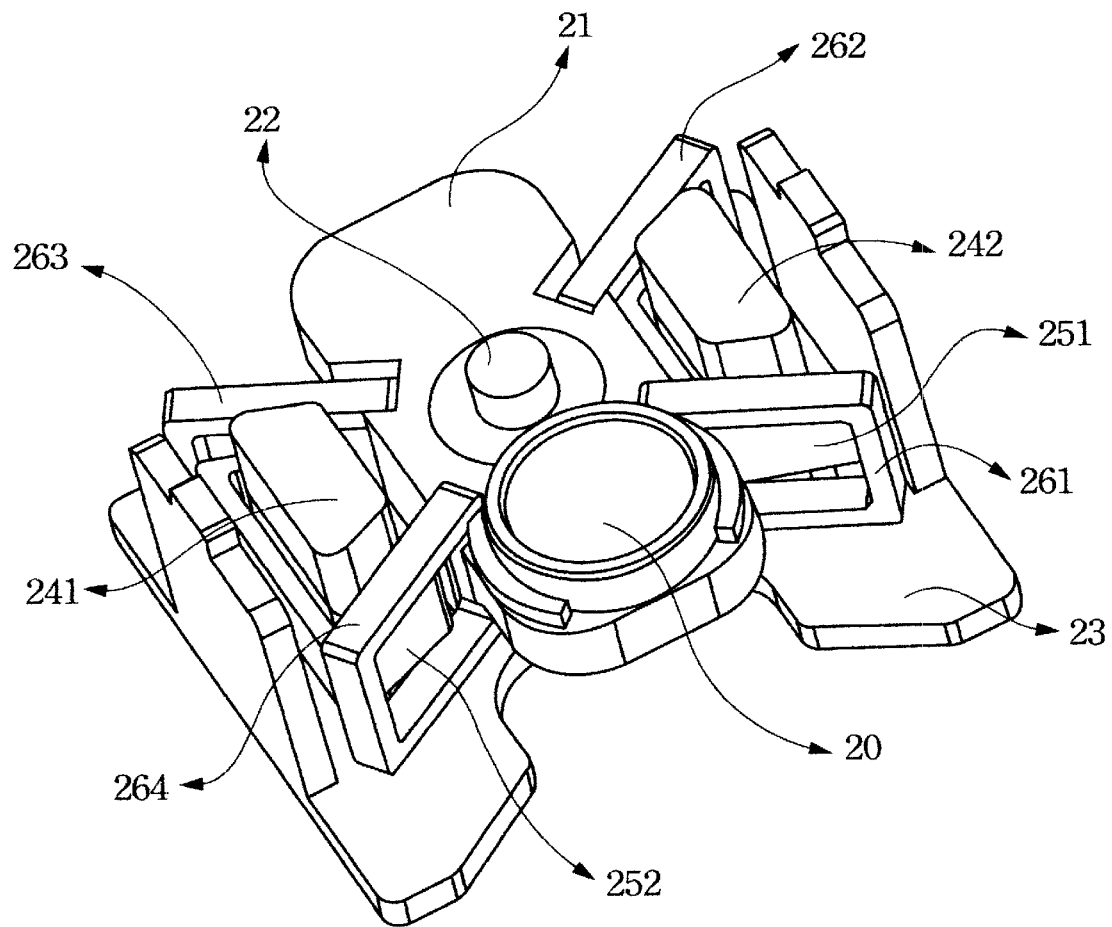
FIG. 2D is a schematic diagram of the electromagnetic actuator.

Further referring to FIG. 2D, a three-dimensional schematic diagram of the present invention is shown. The figure shows the situation wherein the lens holder 21 with the objective lens 20 is placed around the shaft 22. The shaft 22 and the flux generators 241, 242 are mounted on the yoke 23. The focusing drive coil includes the first set of coils 251 and 252 which are fixed on the lens holder 21. The tracking drive coil is directed to the second set of coils 261, 262, 263 and 264 which are fixed on the lens holder 21.

Although a preferred embodiment of the present invention has been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An electromagnetic actuator, comprising:

a flux generator, having a first magnetic part and a second magnetic part, wherein said first magnetic part and said second magnetic part are opposite in order to generate a smooth first set of magnetic lines of force and a smooth second set of magnetic lines of force in an area of magnetic force;

a first set of coils, connected to an object and positioned between said first set of magnetic lines of force and said second set of magnetic lines of force, further opposite to each other, wherein said first set of coils can move said object along a direction of a shaft in response to the tense of electric current actuated in said first set of coils;

a second set of coils, connected to said object and positioned between said first set of magnetic lines of force and said second set of magnetic lines of force at four corners where each coil of said second set of coils faces each other across said object, wherein said second set of coils can rotate said object in response to the tense of electric current actuated in said second set of coils; and a metal piece, connected to said object and positioned adjacent to said first set of magnetic lines of force and said second set of magnetic lines of force in order to control said object at a height and further being able to return said object at a stationary neutral position when the coils are not actuated.

2. The electromagnetic actuator of claim 1, wherein said object is a lens holder for holding an objective lens of an information reading and writing optical head.

3. The electromagnetic actuator of claim 2, wherein said first set of coils is a focusing drive coil and said second set of coils is a tracking drive coil.

4. The electromagnetic actuator of claim 3, wherein a perpendicular line of the plane formed by said tracking drive coil is parallel to a tangent line of the cross circle of said shaft.

5. The electromagnetic actuator of claim 2, wherein said flux generator is made by permanent magnets wherein the polarization areas of said permanent magnets are opposite within said gap.

6. The electromagnetic actuator of claim 5, further comprising another mirrored set of said flux generator, said first set of coils, said second set of coils and said metal piece.

7. An electromagnetic actuator, comprising:

a flux generator, having a first magnetic part and a second magnetic part, wherein said first magnetic part and said second magnetic part are opposite in order to generate a smooth first set of magnetic lines of force and a smooth second set of magnetic lines of force in an area of magnetic force;

a first set of coils, connected to an object and positioned between said first set of magnetic lines of force and said second set of magnetic lines of force, further opposite to each other, wherein said first set of coils can move said object along a direction of a shaft, especially in response to the tense of electric current actuated in said first set of coils; and a metal piece, connected to said object and positioned adjacent to said first set of magnetic lines of force and said second set of magnetic lines of force in order to control said object at a height and further being able to return said object at a stationary neutral position when the coils are not actuated.

8. The electromagnetic actuator of claim 1, wherein said object is a lens holder for holding an objective lens of an information reading and writing optical head.

9. The electromagnetic actuator of claim 2, wherein said first set of coils is a focusing drive coil.

10. The electromagnetic actuator of claim 2, wherein said flux generator is made by permanent magnets wherein the polarization areas of said permanent magnets are opposite within said gap.

11. The electromagnetic actuator of claim 5, further comprising another mirrored set of said flux generator, said first set of coils and said metal piece.

12. An electromagnetic actuator, comprising:

a flux generator, having a first magnetic part and a second magnetic part, wherein said first magnetic part and said second magnetic part are opposite in order to generate a smooth first set of magnetic lines of force and a smooth second set of magnetic lines of force in an area of magnetic force;

a first set of coils, connected to said object and positioned between said first set of magnetic lines and said second set of magnetic lines of force at four corners where each coil of said second set of coils faces each other across said object, wherein said second set of coils can rotate said object around said shaft, in response to the tense of electric current actuated in said second set of coils; and a metal piece, connected to said object and positioned adjacent to said first set of magnetic lines of force and said second set of magnetic lines of force in order to control said object at a height and further being able to provide a restoring force to return said object at a neutral central position when the coils are not actuated.

13. The electromagnetic actuator of claim 1, wherein said object is a lens holder for holding an objective lens of an information reading and writing optical head.

14. The electromagnetic actuator of claim 2, wherein said first set of coils is a tracking drive coil.

15. The electromagnetic actuator of claim 3, wherein a perpendicular line of the plane formed by said tracking drive coil is parallel to a tangent line of the cross circle of said shaft.

16. The electromagnetic actuator of claim 2, wherein said flux generator is made by permanent magnets wherein the polarization areas of said permanent magnets are opposite within said gap.

* * * * *